Nov. 8, 1955     A. L. JONES     2,723,034
LIQUID THERMAL DIFFUSION METHOD

Filed Feb. 12, 1952     2 Sheets-Sheet 1

INVENTOR.
ARTHUR LETCHER JONES
BY
Campbell, Brumbaugh, Free & Graves
HIS ATTORNEYS.

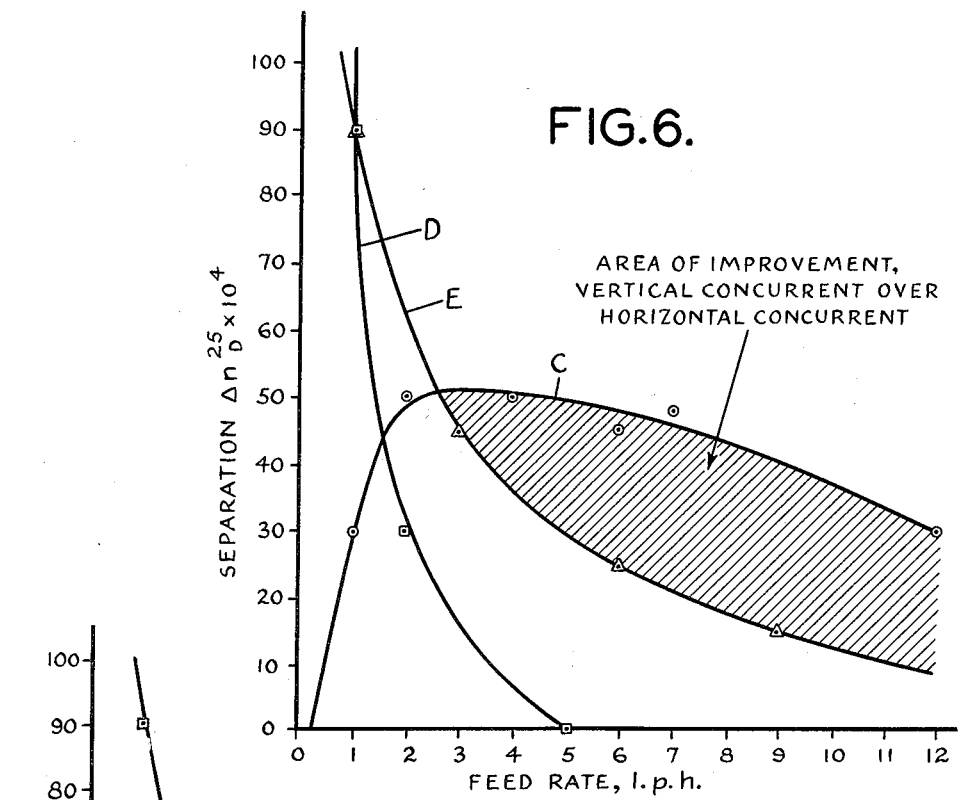
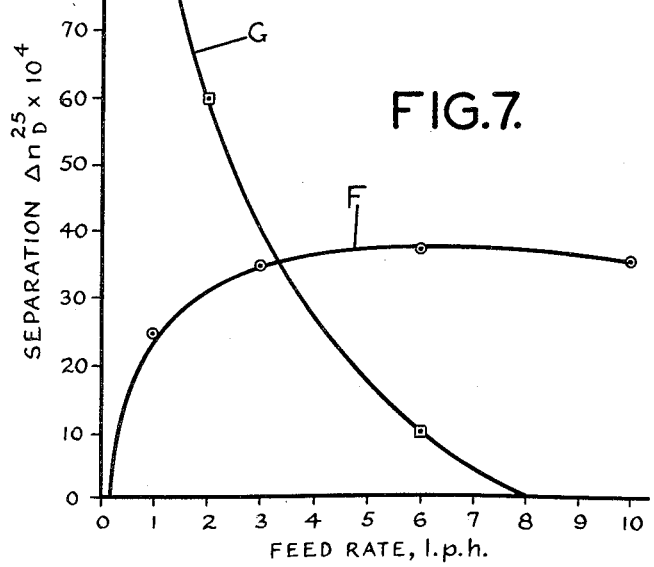

United States Patent Office 2,723,034
Patented Nov. 8, 1955

2,723,034

LIQUID THERMAL DIFFUSION METHOD

Arthur Letcher Jones, Lyndhurst, Ohio, assignor to The Standard Oil Company, Cleveland, Ohio, a corporation of Ohio Application February 12, 1952, Serial No. 271,183

1 Claim. (Cl. 210—52.5)

The present invention relates to a continuous method of separating dissimilar material forming components in or dissolved in a liquid by subjecting the liquid to thermal diffusion.

The history of thermal diffusion began almost one hundred years ago (1856) with an observation that when a liquid mixture, a term intended herein to include mixture and solutions liquid under operating conditions, is subjected to a temperature differential, the mixture undergoes changes in composition at the places of different temperature. This discovery was followed, more than eighty years later (Clusius, Ger. Pat. 738,812, published 1943), by a proposal to take advantage of the thermal diffusion effect by an accumulation procedure which involved utilizing thermal circulation to convey, to different portions of an apparatus presently to be described, the components separated by thermal diffusion.

The apparatus proposed consisted essentially of a closed, rectangular vessel having two closely spaced, opposed, mutually parallel walls with provisions for maintaining the opposed walls at different temperatures. The position of the apparatus was such as to give the slit formed between the opposed walls a vertical component. The wall maintained at the higher temperature, referred to herein as the hot wall, was positioned above the other wall, referred to herein as the cold wall. A liquid mixture in the apparatus, upon being subjected to the temperature gradient across the slit between the hot and cold walls, would separate into two dissimilar fractions. One fraction, enriched in one component, became concentrated along the cold wall, and the other fraction, impoverished in the same component or enriched in another, became concentrated along the hot wall. Because of a difference in density of the two fractions, whether characteristic of the separately concentrated fractions or due to cooling and heating, respectively, and the vertical component of the slit, a thermal, countercurrent circulation was set up tending to move the fraction concentrated along the cold wall toward the lower portion of the slit and to move he other fraction upwardly to the upper end of the slit. This proposal to accumulate by countercurrent thermal circulation the fractions separated by thermal diffusion failed of adoption on any appreciable scale because the volume of liquid that can be treated in any one batch is so small and the heat requirements are so high as to make the method nothing more than a laboratory curiosity.

More recently, the startling discovery was made that both the volume and the degree of separation obtainable by means of liquid thermal diffusion could be increased considerably by continuously introducing the liquid mixture into a narrow slit, having a width of the order of about 0.15 inch or less, maintaining a temperature gradient across the slit, and continuously withdrawing the separated fractions therefrom. Of the many flow patterns possible in such a continuous method, it was found that, at low feed rates, by far the highest degrees of separation were obtainable by having the slit in vertical position, introducing the liquid mixture into the slit at a point intermediate the ends thereof and withdrawing the dissimilar fractions at opposite ends of the slit, i. e., at the upper and lower ends. With this vertical countercurrent flow pattern, the degree of separation decreases rapidly with an increase in the rate of feed. It was concluded, therefore, that it was essential, in continuous liquid thermal diffusion, not to interfere unduly with the accumulating action of thermal circulation or to increase the speed of such circulation to a point at which undue remixing of the separated fractions would occur at the interface between the countercurrent streams set up by the thermal circulation.

The suggestion has also been made recently to carry out continuous liquid thermal diffusion in a horizontal slit wherein the liquid mixture is introduced at the center and two dissimilar fractions are removed at opposite ends. As a substitute for thermal circulation in such a slit, it was proposed to pass lengthwise through the slit a pair of heat-conductive tapes movable in opposite directions. Thus the hot wall was in effect made movable toward one end of the slit and was expected to carry along with it, by surface friction, the fraction concentrated in its immediate vicinity and the cold wall was in effect made movable in the opposite direction, likewise to convey with it the component concentrated in its intermediate vicinity.

Both the vertical slit method and the horizontal movable tape method have in common the further disadvantage that although the distance between the hot and cold walls, referred to herein as the slit width, must be extremely small, i. e., less than 0.15 inch and preferably of the order of about 0.06 inch or less, the liquid within the slit is of necessity divided into two countercurrent streams. While it has been possible to achieve a rather remarkable degree of separation in the vertical column with such countercurrent movement within the slit, the rate of feed at maximum degree of separation is required to be rather small to avoid turbulence and consequent remixing of the countercurrent streams at the interface.

Both these methods, referred to herein as countercurrent flow methods, have the further disadvantage, which is of importance especially in industrial applications, of consuming relatively large quantities of heat to achieve a given degree of separation at higher feed rates.

It has now been found that separations by continuous liquid thermal diffusion can be accomplished much more efficiently at higher feed rates by forming a substantially vertical, continuous and shallow stream of liquid defined by smooth, substantially equidistantly and closely spaced, opposed walls of inert, heat-conductive material, continuously introducing a liquid mixture into the stream at one of the upper and lower ends thereof, maintaining a temperature gradient across the space between the opposed walls and occupied by the stream to concentrate a first, continuously moving fraction enriched in one component of the mixture adjacent one of the walls and to concentrate a second fraction, moving concurrently with the first fraction and impoverished in said one component, adjacent the other of the walls, and continuously and separately removing the two fractions from the stream at the other end. The higher feed rates mentioned above are in excess of the rate that would give the same separation under otherwise identical conditions in the vertical countercurrent flow pattern which comprises continuously introducing the liquid mixture at a point intermediate the ends of said stream and withdrawing a first liquid product from the upper end and a second liquid product from the lower end. In the vertical concurrent flow method, the liquid mixture and any separated or concentrated fractions in any one stream move concurrently, as distinguished from the countercurrent movement thereof in prior art vertical and horizontal liquid thermal diffusion slits having stationary or countercurrently moving walls.

The surprising discovery has been made that when continuous liquid thermal diffusion is carried out in this manner, the degree of separation is at a minimum at extremely low feed rates, rises rapidly as the feed rate is increased to rates at which the degree of separation falls off rapidly in methods involving countercurrent flow of the separated fraction and remains substantially constant at still higher feed rates which, if utilized in countercurrent flow methods, would result in poor separation. In addition, the efficiency, measured in terms of volume and degree of separation per unit of heat consumed, increases with the rate of feed to considerably higher values with the concurrent flow method of this invention than with countercurrent flow methods. It is believed that these differences are due to the fact that with countercurrent flow a feed rate in excess of the rate of thermal circulation interferes with the accumulating function of thermal circulation, whereas with the concurrent flow of this invention thermal circulation is not an appreciable factor in conveying the fractions separated by thermal diffusion to the respective take-off ports.

While the degree of separation obtainable with the vertical concurrent flow method of this invention is lower at low feed rates than with the horizontal concurrent flow method of the invention described and claimed in co-pending application, Serial No. 271,181, filed February 12, 1952, it is a significant advantage of the vertical flow method that at higher feed rates the degree of separation obtainable is higher than is obtainable at equally higher rates with the horizontal concurrent flow method.

Other significant advantages of the vertical concurrent flow method over the horizontal concurrent flow method are that it is more economical and practicable when practiced in a plurality of stages, i. e., in series, parallel, or a combination thereof, and that it may be carried out in annular slits formed by concentric tubes as well as in slits formed by flat plates. Thus, for example, when the vertical concurrent flow method is practiced in slits formed by flat plates, the hot walls for two of the slits may be a single wall or placed "back to back" and be heated by a single heating medium and the cold walls for two of the slits may likewise be a single wall or placed "back to back" and be cooled by a single cooling medium. Similarly, when the vertical concurrent flow method is practiced in annular slits formed by a plurality of sets of concentric tubes, which is not possible in the horizontal concurrent flow method because of the requirement that either the hot or the cold wall, usually the hot wall, be above the cold wall, the inner and outer tubes may all be conveniently heated and cooled, as the case may be, by circulation therethrough and around, respectively, of appropriate heating and cooling media.

These and other advantages, as well as the utility of the method of this invention, will become more apparent from the following detailed description made with reference to the accompanying drawing, wherein.

Figure 4:
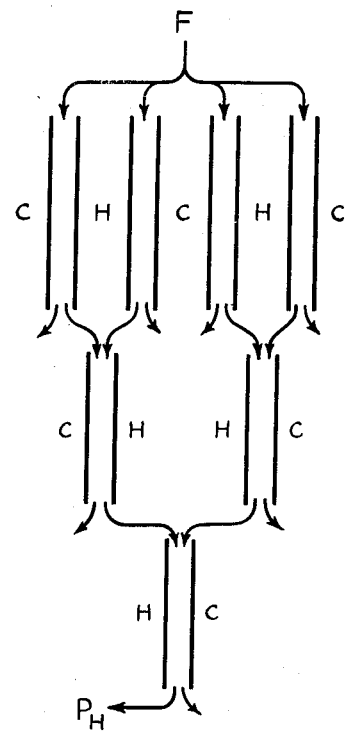
Figure 5:
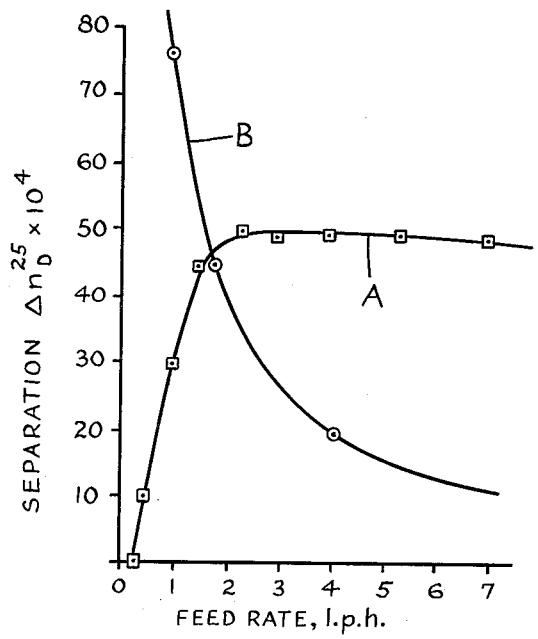

Figure 4 is a schematic illustration of a typical flow pattern wherein a plurality of thermal diffusion columns are utilized in parallel; and Figures 5, 6 and 7 illustrate graphically the separation-feed rate characteristics of the single stage, vertical concurrent flow method of the invention, under various conditions, as compared with the vertical, countercurrent, center feed method, which is probably the most efficient of the methods heretofore proposed, and with the concurrent, horizontal flow method described in application Serial No. 271,181, filed February 12, 1952.

The flow patterns illustrated in Figures 1 to 4, inclusive, are self-explanatory. The vertical lines adjacent the letters "H" and "C" signify hot and cold walls, respectively, the symbol "F" stands for feed of liquid mixture, the symbols $P_H$ and $P_C$ stand for fractions removed from adjacent the hot and cold walls, respectively, and the arrows show the directions of flow.

It is to be understood that the terms "hot" and "cold" as applied to the walls or slit surfaces, and "heating" and "cooling," are used in their relative rather than their absolute sense. Thus, for example, the hot and cold surface of a slit may be maintained at temperatures of say 160° C. and 100° C., respectively, or, if the boiling point of the liquid to be subjected to thermal diffusion is low, at temperatures of say 0° C. and −35° C., respectively. The heating media, in such instances, may be "Dowtherm," steam under pressure, diphenyl vapors, or a boiling mixture of water and ethylene glycol, or it may be ice water. The cooling media, in the examples given, may be a vaporizing liquid, such as ammonia or boiling water.

Figures 1, 2, 3:
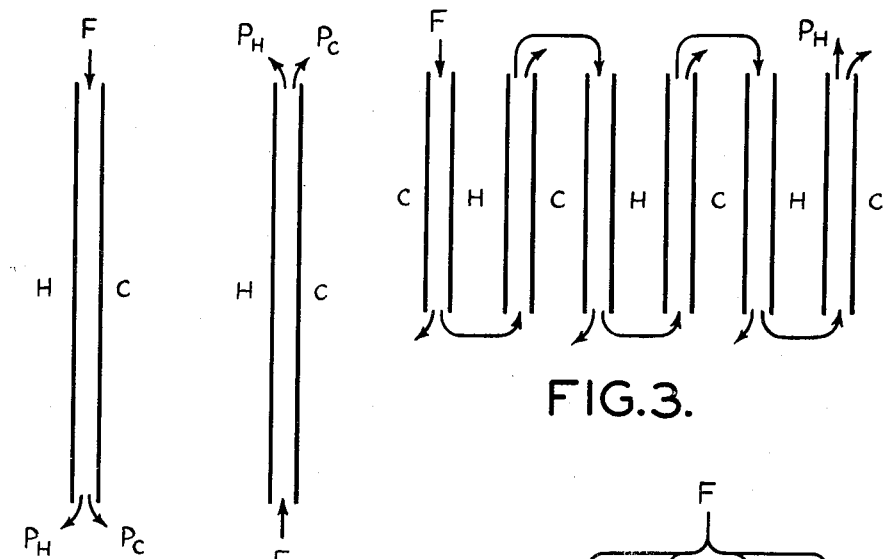
Figures 1 and 2 are schematic illustrations of typical single stage flow patterns.
Figure 3 is a schematic illustration of a typical flow pattern in which a plurality of thermal diffusion columns are utilized in series.

Referring now to Figures 1 and 2, one preferred embodiment only of the method is carried out by forming a continuous, thin, and substantially vertical stream of liquid mixture by introducing it as the feed F into the upper or lower end of a slit defined by equidistantly spaced, stationary and opposed hot and cold walls at a rate preferably in excess of the rate with which the liquid would circulate within the slit due to thermal circulation alone, i. e., circulation induced by differences in density resulting from heating and cooling at the hot and cold walls, respectively. At the other end of the slit two fractions are withdrawn, one, referred to as $P_H$, being withdrawn from adjacent the hot wall, and the other, referred to as $P_C$, being withdrawn from adjacent the cold wall.

When the vertical concurrent flow method of this invention is carried out in thermal diffusion columns wherein the slit is formed by flat plates, excellent results are obtainable by the use of withdrawal ports such as are described more particularly in co-pending applications Serial Nos. 273,737–9 filed February 27, 1952. It is to be understood, however, that the method of this invention is not to be limited to the use of such withdrawal ports.

When the vertical concurrent flow method of the invention is carried out in thermal diffusion columns wherein the slit is formed by concentric tubes, the design of the withdrawal ports may be somewhat different. One such design, referred to by way of example only, is that disclosed in co-pending application Serial No. 268,094, filed January 24, 1952.

Figure 3 illustrates a multi-stage operation designed to obtain the maximum concentration of the component or components that tend to accumulate adjacent the hot wall. In the particular embodiment illustrated, the fraction withdrawn from adjacent the hot wall of the first thermal diffusion slit is introduced into a second slit, the fraction withdrawn from adjacent the hot wall of the second slit is introduced into a third slit, and so on, until a fraction $P_H$ containing a high concentration of the desired material or materials, is withdrawn from adjacent the hot wall of the last slit.

It is to be understood, of course, that it is equally feasible, if the desired material tends to accumulate adjacent the cold wall, to modify the flow pattern illustrated in Figure 3 by directing the fraction withdrawn from adjacent the cold wall of one slit into the next slit and discarding the fraction withdrawn from adjacent the hot walls of the slit.

Figure 4 illustrates a flow pattern wherein the initial liquid mixture is introduced in parallel into four thermal diffusion columns in the first stage, the fractions withdrawn from adjacent the hot walls in the first stage are introduced into the two thermal diffusion columns forming a second stage, the fractions withdrawn from adjacent the hot walls of the second stage are introduced into a thermal diffusion column forming a third stage, and the highly concentrated and desired fraction $P_H$ is withdrawn from adjacent the hot wall of the last thermal diffusion column. Here again, it is, of course, equally feasible to pass the fractions withdrawn from adjacent the cold walls from one stage to another.

The graph in Figure 5 contains two curves, A and B, which compare, in a self-explanatory manner, the degree of separation at various feed rates with a 50/50 ratio of withdrawal of products from adjacent the hot and cold walls obtained by the method of this invention, with results obtained in thermal diffusion slits of identical dimensions but with the feed introduced into the center of a vertical slit and the dissimilar fractions taken off at opposite ends. The material subjected to thermal diffusion was a 50/50 mixture by volume of cetane and monomethylnaphthalene. Both slits had an effective height of 9" and breadth of 9". The slit width, i. e., the spacing between the hot and cold walls, in each instance was 0.035". The hot wall and cold wall temperatures in each case were 270° F. and 70° F., respectively.

In the vertical concurrent flow method, the flow pattern utilized was that of Figure 2 and the slit was provided with withdrawal ports similar to those described in application Serial No. 273,737 and illustrated particularly in Figures 1 and 2 of the drawing in said application. The degree of separation was measured in terms of difference between the indexes of refraction, at 25° C., of the fractions removed from adjacent the hot and cold walls in the concurrent flow tests and from the top and bottom ends of the slit in the center feed, countercurrent flow tests.

Curve A, representing the results obtained in the vertical concurrent flow test described, shows a rapid rise in degree of separation as the feed rate is increased to about two liters per hour and a substantially constant degree of separation at feed rates between 2 and 7 liters per hour. Curve B, representing the results obtained in the center feed, countercurrent flow test, shows that the degree of separation obtainable is higher at feed rates below about 1.5 liters per hour than is obtainable with the concurrent flow method at any rate. These two curves illustrate that significantly improved results are obtained with vertical concurrent flow at rates of feed in excess of the rate at which the separation-feed rate curve for vertical concurrent flow crosses the separation-feed rate curve for vertical countercurrent flow for the liquid mixture being separated.

The sustained high quality of separation obtainable with concurrent flow at higher flow rates, evident from an examination of Figure 5, is manifestly of tremendous importance in making separation of liquid mixtures by thermal diffusion practicable for industrial purposes because of the very considerable saving in heat made possible by accelerating the flow rate through a thermal diffusion column.

The graphs in Figures 6 and 7 contain curves which show, in a similarly self-explanatory manner, the degree of separation obtained by the method of this invention at various feed rates with a 50/50 ratio of withdrawal of products from adjacent the hot and cold walls as compared with the results obtained in thermal diffusion slits of identical dimensions but with (a) the feed introduced midway between the ends of a vertical slit and the dissimilar fractions withdrawn, in a 50/50 ratio, at opposite ends and with (b) the feed introduced at one end of a horizontal slit and the dissimilar fractions withdrawn, in a 50/50 ratio, from adjacent the hot and cold walls thereof. The curves in Figures 6 and 7 are based on the results of Tests I and II, respectively, described in detail immediately below:

TEST I

The material subjected to thermal diffusion was a 50/50 mixture by volume of cetane and monomethyl- naphthalene. In each instance the slit had an effective height or length of 10", a breadth of 10", and a slit width of 0.030". The hot and cold wall temperatures in each case were 270° F. and 70° F., respectively. The results are tabulated in Table I.

Table I

| Feed Rate (liters per hour) | Separation ($\Delta n D^{25} \times 10^4$) |
|---|---|
| C—Vertical, Concurrent Flow: | |
| 0 | 0 |
| 1 | 30 |
| 2 | 50 |
| 4 | 50 |
| 6 | 45 |
| 7 | 48 |
| 12 | 30 |
| D—Vertical, Countercurrent Flow: | |
| 1 | 80 |
| 2 | 30 |
| 5 | 0 |
| E—Horizontal, Concurrent Flow: | |
| 0 | 150 |
| 1 | 90 |
| 3 | 45 |
| 6 | 25 |
| 9 | 15 |

TEST II

The material subjected to thermal diffusion was "300 Red Oil," a commercial red oil having a 50/50 mixture of light and dark components and having a viscosity index of 95. In each instance the slit had an effective height of 69", breadth of 10" and a slit width of 0.05". The hot and cold temperatures in each case were 320° F. and 100° F., respectively. The results are tabulated in Table II.

Table II

| Feed Rate (liters per hour) | Separation ($\Delta n D^{25} \times 10^4$) |
|---|---|
| F—Vertical, Concurrent Flow: | |
| 0 | 0 |
| 1 | 25 |
| 3 | 35 |
| 6 | 37 |
| 10 | 35 |
| G—Vertical, Countercurrent Flow: | |
| 1 | 90 |
| 2 | 60 |
| 6 | 10 |

These results illustrate further the sustained high quality of separation obtainable with concurrent flow at flow rates exceeding the rate of thermal circulation within the stream, i. e., at flow rates beyond which an increase in rate does not give an increase in degree of separation, and further demonstrate the improvement in degree and rate of separation obtainable at higher flow rates with vertical concurrent flow as compared with horizontal concurrent flow.

It has been found generally desirable to withdraw the separated fractions at approximately equal rates, particularly when it is known that the dissimilar components are present in the liquid mixture in approximately equal proportion. When the material to be concentrated is present in relatively small amounts, e. g., when it is desired to concentrate vitamins, comparatively rare isotopes, viruses, or the like, it is frequently most economical to remove the separated fractions at unequal rates, the fraction enriched in the desired material being removed at a lower rate than the other.

The spacing between the opposed walls maintained at different temperatures to provide a thermal gradient across the stream of liquid mixture is desirably of the order of 0.15 inch or less, preferably 0.06 inch or less. The minimum spacing is not as critical a factor as it is in columns designed for countercurrent flow of the separated fractions because there is no problem of avoiding remixing of the separated fractions at the interface between the two countercurrent streams. For economical reasons in the production of the plates or concentric tubes forming the hot and cold walls, it is generally desirable that the spacing of these walls from one another be at least about 0.01 inch.

It is to be understood that many variations, modifications and applications to separation problems will readily become apparent to those skilled in the art upon reading this description. All such variations, modifications and applications are intended to be included within the scope of the invention as defined in the claim.

We claim:

In a process for continuously separating, by thermal diffusion, two fractions containing dissimilar materials that are normally liquid under the conditions of separation and which are included in a mixture normally liquid under the conditions of separation, the improvement which comprises forming a substantially vertical, continuous and thin stream of liquid defined by smooth, substantially equidistantly and closely spaced, opposed walls of inert, heat-conductive material; continuously introducing the liquid mixture into the stream at one of the upper and lower ends thereof; maintaining a temperature gradient across the space between the opposed walls and occupied by the stream to concentrate a first continuously moving fraction enriched in one component of the mixture adjacent one of the walls and to concentrate the second fraction, moving concurrently with the first fraction and impoverished in said one component adjacent the other of the opposed walls; said liquid mixture being continuously introduced at a rate in excess of the rate at which the separation-feed rate curve for vertical concurrent flow crosses the separation-feed rate curve for vertical counter-current flow for the liquid mixture being separated under otherwise identical conditions; and continuously and separately removing the two fractions from the stream at the other end.

References Cited in the file of this patent

UNITED STATES PATENTS

| 2,521,112 | Beams | Sept. 5, 1950 |
| 2,541,071 | Jones et al. | Feb. 13, 1951 |
| 2,585,244 | Hanson | Feb. 12, 1952 |

FOREIGN PATENTS

| 738,812 | Germany | Sept. 2, 1943 |